United States Patent [19]

Phillips et al.

[11] 4,088,457

[45] May 9, 1978

[54] DEGASIFICATION SYSTEM

[75] Inventors: Victor Quin Phillips; Phil Harmon Griffin; Martin James Sharki, all of Houston, Tex.

[73] Assignee: Dresser Industries, Inc., Dallas, Tex.

[21] Appl. No.: 754,854

[22] Filed: Dec. 27, 1976

[51] Int. Cl.² ............................................... B01D 19/00
[52] U.S. Cl. ......................................... 55/194; 55/199
[58] Field of Search ........................ 55/52, 192–194, 55/199, 203

[56] References Cited

U.S. PATENT DOCUMENTS

| | | | |
|---|---|---|---|
| 2,142,270 | 1/1939 | Vander Henst | 55/193 |
| 2,243,176 | 5/1941 | Vander Henst | 55/192 |
| 3,616,601 | 11/1971 | Senkewich | 55/52 |
| 3,769,779 | 11/1973 | Liljestrand | 55/192 X |
| 3,898,061 | 8/1975 | Brunato | 55/193 |

*Primary Examiner*—Frank A. Spear, Jr.
*Assistant Examiner*—Richard W. Burks
*Attorney, Agent, or Firm*—Michael J. Caddell; Eddie E. Scott

[57] ABSTRACT

A unique degasifying system for removing entrapped gas bubbles from a viscous drilling fluid utilizes a hollow shaft pump having a hollow impeller, with a prerotation chamber and impeller shroud below the impeller; a spray vessel having a continuous sheet radial spray head and vacuum creating means therein; a vacuum conduit connecting the vacuum creating means to the hollow shaft of the pump; and an enclosed degasifying trough connected to the spray vessel and having fluidic seal means at each end, with a gas exhaust conduit connected thereto.

10 Claims, 5 Drawing Figures

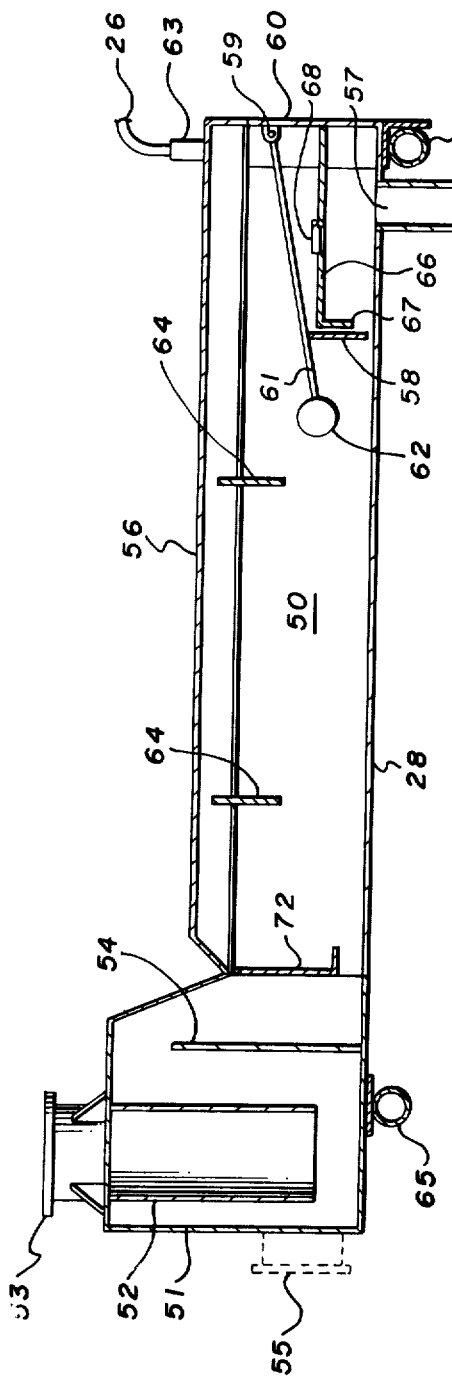
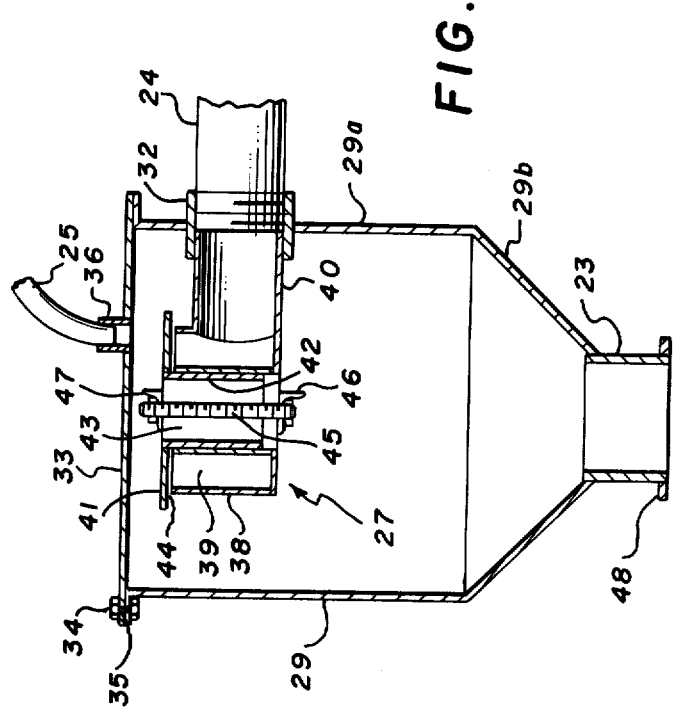
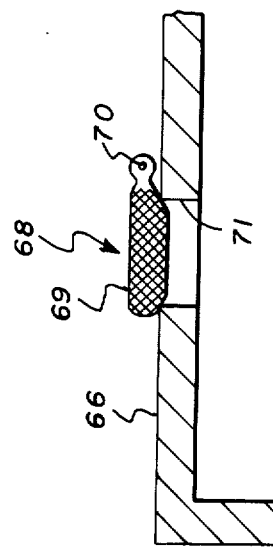

DEGASIFICATION SYSTEM

BACKGROUND OF THE INVENTION

The present invention relates to the art of drilling fluid processing, and more particularly to a system for degassing drilling muds. The present invention provides a centrifugal pump system for pumping gas laden drilling fluids while restricting the flow of gases removed from such liquids to conduits by which they are carried to safe disposal areas. Such a centrifugal pump system is desirable for the transfer of such gas laden fluids into degassing or deaerating vessels, or out of such vessels during periods of incomplete degassing.

In drilling a well for oil, gas and the like, the drilling bit is supported in the well bore by tubing. The tubing is hollow pipe composed of a plurality of individual lengths of pipe connected together. The tubing carries drilling fluid in its interior down to and through the drilling bit. The drilling fluid at the bottom of the well bore passes upwardly in the annulus between the exterior surface of the tubing and the interior surface of the well bore to the surface of the earth and then through a return pipe to storage pits on the surface of the earth commonly referred to as mud pits.

The drilling mud is ordinarily an aqueous suspension of solid matter generally containing minerals such as bentonite and barite. The drilling mud lubricates and cools the drill bit and serves as a carrier to withdraw drill cuttings and debris from the well for disposal. The drilling mud also provides a pressure seal in the well bore to prevent the escape of gases from the well. The pressure exerted by the column of drilling mud normally is greater than the pressure which may be released upon encountering gas pockets as the well is drilled. The column of drilling mud counteracts gas pressure and prevents blowouts but very often becomes contaminated with the gases encountered during the drilling operation.

Under many circumstances it is desirable and in fact often obsolutley essential that the gases be removed from the drilling mud and transmitted to a disposal area. Since it is economically unfeasible to discard the contaminated drilling mud and because of the danger of the gases in the mud being released into the atmosphere in large quantities creating dangerous conditions at the drill site, it is necessary to process the mud to remove the gases and recirculate the degassed drilling mud through the borehole. The contaminating gases may be poisonous or highly explosive and the release of such gases into the atmosphere would present a substantial risk to personnel in the drilling area. The presence of gases in the drilling mud decreases its weight and affects its viscosity often rendering it unsuitable for recirculation through the borehole. When gases are contained in the drilling mud being circulated through the borehole, it increases the danger of a blowout in the well.

A "Notice to Lessees and Operators of Federal Oil and Gas Leases in the Outer Continental Shelf, Gulf of Mexico Area" was released May 7, 1974 by the United States Department of the Interior Geological Survey, Gulf of Mexico Area, relating to hydrogen sulfide in drilling operations. The notice outlines requirements for drilling operations when there is a possibility or probability of penetrating reservoirs known or expected to contain hydrogen sulfide. Section 3. f. provides that "drilling mud containing $H_2S$ gas shall be degassed at the optimum location for the particular rig configuration employed. The gases so removed shall be piped into a closed flare system and burned at a suitable remote stack."

The prior art shows examples of systems for the degasification of drilling mud, many of which utilize a vacuum tank and some sort of baffle arrangement which exposes the drilling mud to vacuum environment, thus causing the entrapped gas to be removed. This is only part of the task however for serious problems are encountered in the handling of drilling muds, particularly in evacuating the drilling mud from the vacuum tank to return it as degassed mud to the well head. Precise control of the rates at which drilling mud enters the vacuum tank, degassed mud leaves the vacuum tank, and gases are evacuated from the tank, is necessary in order to produce an acceptable product at the necessary rate.

Some systems of the prior art use a separate vacuum pump and often expose this apparatus to the possibility of ingestion of drilling muds, a situation which normally damages the pumping mechanism and, at the very least, forces the entire system to be shut down for cleaning. Prior art devices have also exhibited problems in matching the vacuum pulled on the vacuum tank with the flow requirements of the entire system, which may be continually changing.

Numerous efforts have previously been made to eliminate the use of a mud jet for effecting the flow of mud such as substituting a centrifugal pump for the mud jet. However, such previous efforts have not been entirely successful inasmuch as a pump tends to become air-locked when the supply of mud to the tank is insufficient, or when vortexing of mud in the tank permits air or gas to enter the pump or when air or gas is present in the mud for any reason. Even when self-priming centrifugal pumps are used, several minutes may elapse before the pump resumes effective pumping action and during that period the efficiency of the degassing operation in the tank is materially affected. Previous attempts to provide vapor-vented centrifugal pumps include that disclosed in U.S. Pat. No. 3,815,717 which is not practical in abrasive fluids such as drilling muds because of rapid wear on its seals. A design disclosed by U.S. Pat. No. 3,769,779 avoids the abrasion of seals but requires the freed gas to flow counter to the incoming fluid at one or more points.

DESCRIPTION OF PRIOR ART

In U.S. Pat. No. 3,769,779 to Walter E. Liljestrand, patented Nov. 6, 1973, an apparatus is shown for degassing fluids, particularly drilling muds, comprising a vessel having an inlet and an outlet for the intake and discharge of the fluid to be treated, a centrifugal pump connected to the vessel for circulating the fluid through the vessel and means for removing gas from the region of the impeller means in the centrifugal pump. The invention also includes a centrifugal pump designed for handling gas laden fluids, the pump having a means for removing gas from the region of the pump impeller. The invention further includes a centrifugal pump for handing corrosive and/or abrasive fluids wherein said fluids are prevented from contacting the pump seal by means of a gas pressurized compartment adjacent the seal.

In U.S. Pat. No. 3,616,599 to Gerald E. Burnham, patented Nov. 2, 1971, a drilling mud degasification apparatus is shown having baffle plates in a vacuum tank over which thin films of mud are degassed as they flow downward to a receiving area of the tank. Venturi-type dual ejector apparatus is located in a sump in the tank to remove degassed mud and to draw a vacuum on the upper portion of the tank.

In U.S. Pat. No. 3,241,295 to Phil H. Griffin, III et at, patented Mar. 22, 1966, a mud degasser apparatus combination is shown with a mud degasser vacuum tank having a mud inlet and a mud outlet for continuous flow of mud through the tank, means for maintaining the interior of said tank at sub-atmospheric pressure, valve means provided in said mud inlet for controlling the rate of flow of mud into the tank, means responsive to variations of level of mud in said tank for varying the sub-atmospheric pressure in the tank, and means responsive to variations of pressure in the tank for opening and closing said valve means.

In U.S. Pat. No. 3,249,227 to Alfred B. Long, patented May 3, 1966, a centrifugal separator is shown for the treating (mechanical processing) of slurries, and for the classification by specific gravity of solids in slurries and muds, of components of emulsions, and also for the degasification of drilling muds. It is suitable for use in the chemical, mining, and petroleum industries.

In the publication "A Degasser You Can Understand" by Walter E. Liljestrand, presented at IADC Rotary Drilling Conference in March 1974, a description of mud degassing is set out. A degasser is one of several important components necessary on a rig to handle gas in mud. This paper gives perspective to the whole problem. The atmospheric degasser described is entirely new in concept. The flow is controlled by the liquid and the pump.

SUMMARY OF THE INVENTION

The present invention provides a system for the degasification of drilling mud in a continuous manner as the mud is circulated to and from a well head. The present invention provides a centrifugal pump degassing system capable of pumping gas laden liquids, including drilling fluids, while restricting the flow of gases removed from such liquids to conduits by which they are carried to safe disposal areas. Such a centrifugal pump degassing system includes the transfer of such gas laden fluids into degassing or deaerating vessels, or out of such vessels during periods of incomplete degassing.

One embodiment of the centrifugal pump degassing system of the present invention includes a hollow centered impeller driven by a hollow shaft through which the gas may be withdrawn without having to move through a fluid filled zone. A prerotation inlet chamber below the impeller admits drilling mud into the impeller housing in a peripheral flow with the released gas flowing from the vortex of the chamber and the impeller through the hollow drive shaft and into a conduit which leads directly into the degassing vessels. The impeller shroud gives the drilling mud additional rotational velocity through a reduced radius, further establishing a central vortex toward which any gas escaping from the fluid will be forced by the mud up the hollow impeller shaft. Released gas flows in the same axial direction through the pump as the mud. The drilling mud exits the impeller housing throgh the exit port and moves in response to the pump pressure into a cylindrical vessel where it is emitted in a radial spray pattern against the wall of the vessel. A central opening in the spray pattern is maintained which communicates the vessel above the spray pattern to that portion of the vessel below the pattern. The spray pattern preferably impinges on the full periphery inside the vessel and this pattern provides advantages not realized in other spray configurations.

The foregoing and other objects and advantages of the present invention will become apparent from a consideration of the following detailed description of the invention when taken in conjunction with the accompanying drawings.

BRIEF DESCRIPTION OF THE DRAWINGS

FIG. 3 is an enlarged view, partly in section, of the spray vessel.

FIG. 4 is a partial cross-sectional side view of the gas separation trough.

FIG. 4a is an enlarged view of a portion of the structure shown in FIG. 4.

DETAILED DESCRIPTION OF THE INVENTION

Figure 1:
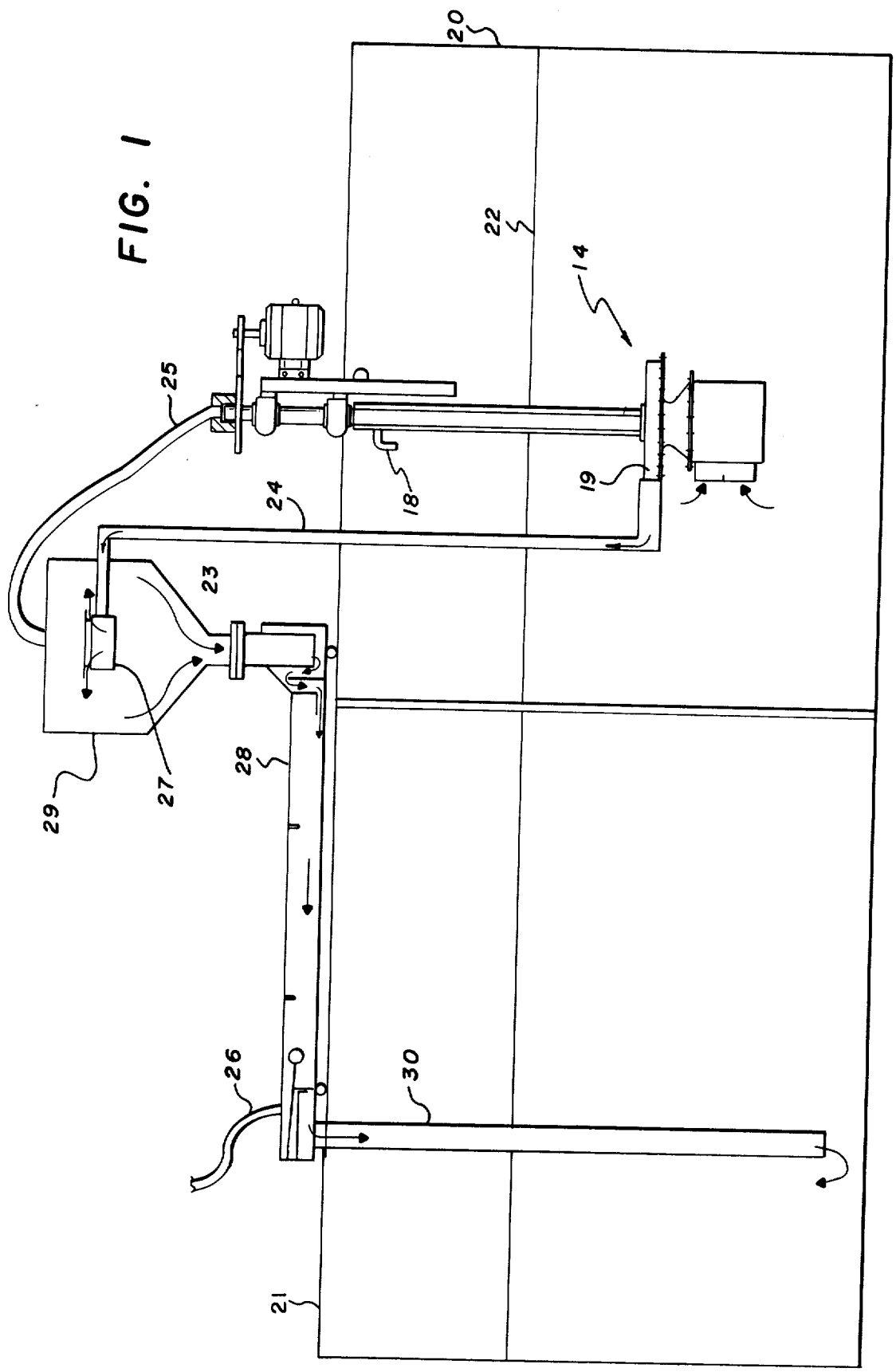
FIG. 1 illustrates a degassing system constructed in accordance with the present invention.

Referring now to the drawings and, in particular, to FIG. 1, an embodiment of a degassing system constructed in accordance with the present invention is illustrated. Gas contaminated drilling mud 22 from mud tank 20 is directed to a mud spray vessel 29 through line 24 by a pump system 14. A vacuum created in vessel 29 is communicated by conduit 25 to a top cap 12 with a rotatable seal on the top end of the hollow pump shaft of pump 14. Mud is pumped via line 24 through the wall of vessel 29 and is sprayed outward through spray head 27 where it impinges the wall of vessel 29 and moves downward, out the bottom discharge tube 23. From tube 23 the mud passes into the gas separation trough 28 and flows down the trough under a float-operated gate 58, down the return pipe 30 and back into degassed mud tank 21.

The pumping system 14 of this invention provides a centrifugal pump capable of pumping the gas laden drilling mud 22, while restricting the flow of contamination gases removed from the drilling mud to conduit 25, by which they are conveyed via vessel 29, trough 28, and conduit 26 to safe disposal areas. The pumping system 14 transfers the gas laden drilling mud into the spray vessel 29.

It is well known that conventional centrifugal pumps tend to become vapor locked which seriously reduces the volume capacity of the pumps, limiting their effectiveness in handling fluids. Previous attempts to provide vapor-vented centrifugal pumps include that disclosed in U.S. Pat. No. 2,815,717 which is not practical in abrasive fluids such as drilling muds because of rapid wear on its seals. The design disclosed by U.S. Pat. No. 3,769,779 avoids the abrasion of seals but requires the freed gas to flow counter to the incoming fluid at one or more points.

Figure 2:
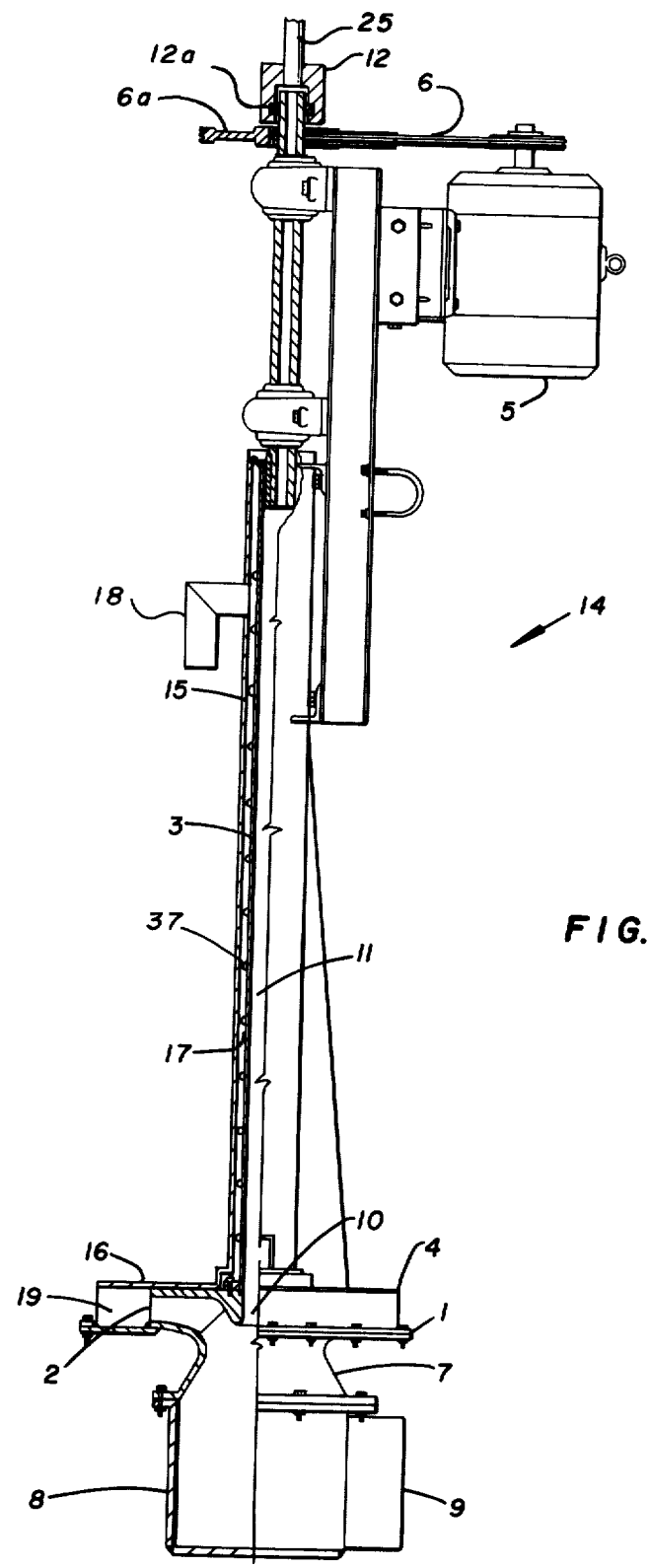
FIG. 2 is an enlarged view, partly in section, showing the centrifugal pumping means from the system shown in FIG. 1.

As can be better seen in FIG. 2, the pumping system 14 of the present invention uses a hollow centered impeller 2 driven by a hollow shaft 3 through which the gas may be withdrawn without having to move through a fluid filled zone. A prerotation inlet chamber 8 and shroud 7 below the impeller 2 admit free fluid into the impeller housing 4 in a peripheral flow. Released gas flowing from the vortices of chambers 7 and 8 and of the impeller 2 moves upward through the hollow drive shaft 3, thence through the top of the shaft into a top cap 12 which has dynamic seals 12a therein for sealing engagement with the rotating shaft.

The centrifugal pump includes an impeller 2 rotatably mounted on shaft 3 and made to rotate in impeller housing 4 by a motor 5 driving the shaft 3 through a sheave 6a and belt drive 6. A shroud section 7 and a prerotation inlet section 8 are attached to the impeller housing 4. Fluid enters the prerotation inlet section 8 through essentially tangential entrances 9, giving the fluid a circular motion in the direction of rotation of impeller 2. The fluid must then pass through the shroud section 7 to reach the impeller and in so doing it is given additional rotational velocity by the reduced radius, further establishing a central vortex through which any gas escaping from the fluid will be released toward the central longitudinal axis of the pump shaft and up the shaft. The released gases rise through the central opening 10 in impeller 2, through the hollow center 11 of shaft 3, to the conduit 25 in top cap 12.

Fluid under pressure from the impeller rotation exits the impeller housing through port 19 but is also free to enter the space between impeller 2 and the top 16 of housing 4 and into the annular space 17 between the shaft 3 and shaft housing 15. When the impeller is not in motion, the fluid level in the annulus 17 will be that of the external fluid, but when impeller is turning the pressure developed could force the fluid somewhat higher in the annulus 17. To prevent such rise, a discharge tube 18 may be provided through which such pressure can be relieved by venting the small flow of fluid which may migrate upward through space 17. Also, a double helical vane 37 may be affixed to the outside of the impeller shaft 3 to provide a downward impetus on any flow of fluid up the annulus 17, or an annular dynamic seal could be located between shaft 3 and housing 15.

Referring now to FIG. 3, the spray vessel is illustrated in cross-section. The vessel 29 generally comprises a cylindrical upper section 29a, a frustoconical intermediate section 29b and the bottom discharge tube 23. The mud inlet line 24 is attached to a transmit collar 32 which is sealably secured in the wall of vessel 29. A top cover plate 33 is sealingly secured to the upper section 29a by means such as bolts 34 passing through flange 35. An upper discharge pipe 36 communicates with an opening in plate 33 and has connected thereto the gas flow conduit 25.

The spray assembly 27 is suspended in a generally central location inside vessel 29 by means of an inlet conduit 40 which in turn is attached to collar 32 in coaxial alignment therein. Assembly 37 generally comprises an outer annular flow bowl 38 which generally includes a double-walled cylindrical member closed at the bottom and open at the top. The enclosed area 39 formed by the two walls and bottom of bowl 38 is in fluid communication with flow line 24 via collar 32 and inlet conduit 40.

A deflector plate 41 is located directly above annular space 39 and in close proximity to bowl 38. The location of plate 41 with respect to bowl 38 forms a relatively narrow spray gap 44 therebetween. Plate 41 preferably is of a larger diameter than bowl 38 to prevent fluid spray from going upward in vessel 29. The plate has a central opening in which is secured a cylindrical center spool 42 which in turn fits in relatively close-fitting relationship inside the central space of bowl 38.

Center spool 42 has an open passageway 43 passing therethrough. The center plate and spool arrangement is supported by a threaded bolt member 45 which is threadably engaged at its lower end in a cross member support 46 and at its upper end in a similar cross member support 47. Cross member 47 extends across bore 43 and is attached to plate 41 at each end of the cross member by means such as welding or bolts. Likewise, cross member 46 extends across opening 43 and is attached at each end to the bottom of bowl 38 by means such as welding.

Adjustment of spray gap 44 is obtained by rotating plate 41 clockwise to narrow gap 44 or counterclockwise to widen gap 44. The rotation of plate 41 also rotates threaded cross member 47 which moves the plate and cross member up and down on the threaded bolt 45.

FIG. 4 is an enlarged cross-section of the gas separation trough 28. This primarily consists of an elongated enclosed flow trough 50 connected to an inlet cabinet 51. The inlet cabinet has at the top an inlet conduit 52 having an annular flange 53 at the top thereof. A corresponding matching flange 48 is located at the bottom of the discharge tube 23 of vessel 29.

The matching flanges 48 and 53 allow placement of vessel 29 atop trough 28 where it may be attached by means such as bolts passing through the complementary flanges. The inlet tube 52 is in coaxial alignment with discharge conduit 23 and extends through a substantial portion of cabinet 51 to a point near the bottom thereof. An alternate location for conduit 52 is drawn in phantom at 55 for configurations where height of the assembly is limited.

A vertical baffle plate 54 is attached to the bottom of cabinet 51 and extends entirely across the cabinet from one side to the other. A second plate 72 extends downward from the top of the trough to a point above the bottom of the trough, forming a flow space thereunder. A peaked roof 56 is hingedly attached to channel section 50 and completely closes this section of the trough.

The inlet cabinet 51 is also completely closed. A discharge port 57 is located near the end of channel section 50 and is in communication with mud return pipe 30. A flow control plate 58 is secured to float arm 61 which is hingedly attached at 59 to the far end 60 of the trough. The plate extends substantially across the width of the trough and is located forward of port 57.

A float member 62 is secured to the opposite end of arm 61 from connection 59. An enclosure plate 66 is secured to the back 60 of the trough and extends forward over discharge opening 57. A downward extending front plate 67 is attached to the front edge of plate 66 in close sliding relationship with control plate 58. Plates 58, 66, and 67 preferably extend substantially across the width of trough 28. A checkvalve 68, which can be of any of the many known one-way valves, may be provided on plate 66 to allow discharge of gas trapped therebelow.

FIG. 4a illustrates one type of checkvalve which can be used in plate 66. In this instance, a hinged damper valve 69 is pinned to plate 66 by pin 70 such that it is arranged to rest in a closing position on port 71 which passes through plate 66. Gas pressure below plate 66 can move upward through port 71, lifting valve 69, and moving into the upper portion of trough 28. Gas or fluid flow downward through port 71 is prevented by the closing of damper 69.

It should be noted that the action of the gate assembly comprising float 62, arm 61, and plates 58, 66, and 67, is to ensure a fluidic seal between trough 28 and discharge port 57 in order to provide a barrier to the passage of gas through port 57. As a further means of preventing gas flow through port 57, discharge conduit 30 may be extended upward a predetermined distance past the bottom of trough 28. This distance could be selected to locate the top of conduit 30 higher than the bottom of plate 67.

A gas discharge tube 63 passes through the peaked roof 56 and has secured thereto a gas flow line 26. One or more vertical baffles 64 extend across a substantial portion of the width of the trough 28 and extend downward into the trough towards the bottom thereof. These may be welded or secured to the sides of the trough and are open in the peaked roof section 56. Roof section 56 in one embodiment had a slope of 45 degrees with the peak being located generally centrally along the roof section.

In typical operation, the mud gas separator assembly of this invention may be assembled at a well drilling site and placed on the mud tanks 20 and 21 by means such as extended cross member pipes 65 which are of sufficient length to span the width of the tank 20. The motorized pump assembly may also be suspended from the side of the tank by hanger means or other means known in the art. The drilling fluid is pumped into the tank 20 from the drill site preferably through a device which removes solids such as rock cuttings and sand from the drilling mud.

The pump motor is started and fluid is drawn into the tangential inlets 9 in chamber 8 and upward through shroud 7 whereupon it is expelled through discharge port 19 by impellers 2.

A central vortex is formed in the center of the hollow impeller member at 10 and gas bubbles which become separated from the mud in the centrifugal pump are moved inwardly into area 10 by the action of the heavier mud being moved outward in response to the centrifugal forces imposed on it by the pump impeller. The separated gas moves upward through the hollow center 11 of shaft 3 and out through the top of the hollow shaft which is sealingly covered by the top cap 12.

The pumped mud moves out discharge port 19 into conduit 24 and thence upward into spray vessel 29. At spray vessel 29, the mud moves through collar 32 into the conduit 40 and the annular space 39. The high pressure mud is forcefully emitted through narrow gap 44 against deflector plate 41 forming a circular spray outward from plate 41 against the inside surface of the outer wall of vessel 29. This spray of fluid forms a "doughnut" shape having an open central portion at 43.

The action of the spray outward against the wall of the vessel establishes a strong vacuum in the upper portion of the vessel above the spray. The action of the fluid against plate 41 serves to place the fluid in high turbulence and shear which results in a combining of many small entrained gas bubbles into larger bubbles. The reason for the creation of the high vacuum in the upper part in the chamber appears to be a result of the venturi effect of the spray outward and the open central passage 43.

this creation of a high vacuum is very beneficial to drawing the small bubbles in the fluid together and out of the fluid. The vacuum is also beneficial by its effect on the centrifugal pump 14. The vacuum communicates with the pump 14 through conduit 25. This action serves to further draw off the gas separated in the pump at the central opening 10. The vacuum further enhances the efficiency of the pump by reducing the so called vapor lock and cavitation effects in the impeller area and by further aiding in the intake of fluid into the pump as a result of this vacuum.

Thus, the created vacuum in the upper portion of vessel 29 is a multi-purpose advantage. It aids in the combination of small bubbles into large bubbles; it aids in drawing the entrapped gas bubbles from the fluid both in the vessel 29 and in the impeller area of the pump 14; and it further increases the efficiency of the centrifugal pump in one or more ways.

The mud is emitted through spray gap 44 in a continuous sheet and impinges on the wall of vessel 29, and flows downward therealong until it reaches the discharge tube 23 from which it passes into the intake 52 of the separator trough. The fluid flows downward to the bottom of cabinet 51, back upward over the top of flow baffle 54, and then down again under plate 72. Plates 54 and 72 prevent open communication from the upper portion of channel 50 to the vessel 29. This results in a maintenance of the high vacuum in vessel 29.

Were plates 54 and 72 to be removed, an open communication of the vacuum area of vessel 29 would be permitted with the discharge line 26, and the vacuum would be greatly reduced. Thus, the placement of the baffles creates narrow openings at the top of the cabinet and the bottom which generally are filled by the flow of fluid from conduit 52, thus effectively forming a liquid seal and so preventing open gas communication therepast.

Small gas bubbles are combined in vessel 29 to form large bubbles which pass through conduit 52 in the drilling fluid over baffle 54, under plate 72, and into the trough section. Although the bubbles are still in the fluid, they have been enlarged by having been combined through the turbulence and vacuum effects in vessel 29 to the point where they have sufficient buoyancy to rise to the top of the fluid stream in the enclosed trough section 50. The baffles 64 slow transit of the foamy upper level of fluid containing the highest concentration of gas bubbles in order to allow them more time to break out of the mud.

The entire operation of the degassing system depends in large part upon combining the small entrapped gas bubbles into larger bubbles so that their total buoyance is sufficient to overcome the inertia and viscosity of the heavy fluid in which they are entrapped. The operation of the present invention is advantageous in that the discharge gas which collects at the top of the trough section 50 is under a net positive pressure and therefore flows freely from the trough section through hose 26 without need for mechanical removal means such as a vacuum pump or fan.

The resulting positive gas pressure is trough section 50 apparently is a result of the hydrostatic head of the fluid in vessel 29 acting through the entirely enclosed vessel 29 and trough 28. An optimum level of fluid in the trough is maintained by gate 58 which preferably is connected to an adjustable float member 61 for maintaining the predetermined fluid level.

It should also be pointed out that one of the important parameters involved in the gas separation process is the time of transit of the fluid through the separation trough. A trough of insufficient length for the given flow velocity of the drilling fluid therethrough will not allow sufficient time to accomplish an acceptable gas separation rate because of the lack of time for the smaller bubbles to overcome the fluid inertia and viscosity and rise to the surface.

It was found in one particular embodiment that a trough length of approximately eight feet provided a gas removal rate of around 85 percent in a test slurry pumped at 400 GPM. Any additional length will provide small increases in the percentage of gas removed from the fluid. Additional methods of increasing the residence time of the fluid in the separation trough include lowering the pumping rate, increasing the cross-sectional flow area of the trough, and altering the depth of the drilling mud maintained in the trough.

Thus, it can be seen that with the present invention, many advantages are obtained in the degasification of the drilling mud. One of these advantages involves eliminating the need for a mechanical vacuum pump or blower device to remove the possibly dangerous gases from the separator assembly. Another advantage obtained involves the much greater pumping efficiency of the centrifugal pump arising from the application of the vacuum to the impeller vortex area. Another advantage gained is capture of the removed gases from the pump vortex area and the conveyance of these gases to a section of a vessel where they can be captured and flowed to a safe disposal area.

Further advantages involve the more efficient combining of small gas bubbles into the more easily removable large bubbles as a result of the high vacuum formed in the spray vessel and the more effective removal of bubbles as a result of the efficient design of the separator trough. Other advantages not discussed herein or readily apparent from the description above are obtainable with the practice of this invention.

Although a specific preferred embodiment of the present invention has been described in the detailed description above, the description is not intended to limit the invention to the particular forms of embodiments disclosed therein since they are to be recognized as illustrative rather than restrictive and it will be obvious to those skilled in the art that the invention is not so limited. For instance, whereas the spray vessel 29 has been described as a cylindrical vessel, it is obvious that one could substitute other configurations for this vessel such as square, rectangular, oval, etc. Also, whereas a centrifugal impeller type pump is utilized with this invention, it is clear that other types of fluid pumping apparatus would be workable with this invention. Also, whereas the mud gas separator trough 28 has been described as a rectangular vessel having an elongated flow channel with a peaked roof, it is obvious that other cross-sectional configurations of this trough could be utilized such as a U-shaped trough or a circular trough. A further modification would involve providing a gas conduit from the upper portion of vessel 29 to the lower portion of the vessel in lieu of communication through a central opening 43 in spray assembly 27. Thus, the invention is declared to cover all changes and modifications of the specific example of the invention herein disclosed for purposes of illustration which do not constitute departure from the spirit and scope of the invention.

The embodiments of the invention in which an exclusive property or privilege is claimed are defined as follows:

1. A system for degasifying drilling fluids from a drilled borehole, said system comprising:
  pump means arranged to pump drilling fluid and having intake and discharge port means;
  spray vessel means connected fluidically to said discharge port means;
  said spray vessel means having an enclosed vessel with an intake conduit, a spray assembly, a deflector plate therein, vacuum creating means in said spray assembly, and a discharge opening;
  a degasser vessel in a position lower than said spray vessel means and in fluid communication with said discharge opening; and,
  said degasser vessel being substantially enclosed and airtight, with a gas discharge port and a fluid discharge port.

2. The fluid degasifying system of claim 1 wherein said spray vessel means is located above said pump means a sufficient distance to be above the drilling fluid level.

3. The fluid degasifying system of claim 2 wherein said spray vessel means is closed to the atmosphere and further comprises a gas suction port in communication with said vacuum creating means in said spray assembly.

4. The fluid degasifying system of claim 3 wherein said pump means is a centrifugal impeller-type pump having a central opening in the impeller in communication with said gas suction port.

5. The fluid degasifying system of claim 3 wherein said degasser vessel further comprises means for maintaining a liquid seal between said gas discharge port and the rest of said degasser vessel.

6. A closed system for the removal of a substantial amount of entrapped gas from a fluid such as drilling mud, said system being substantially isolated from the atmosphere and comprising:
  a power operated fluid pump having intake means for location in a drilling fluid tank and discharge means for discharging fluid pumped from a tank;
  an enclosed spray vessel having an inlet pipe connected to said discharge means and a spray assembly therein connected to said inlet pipe;
  said spray assembly adapted to emit pumped fluid in a continuous sheet radial pattern against the inside wall of said vessel and having a vacuum opening therethrough;
  a fluid discharge port in the lower portion of said spray vessel and a gas suction port in the upper portion of said vessel; and,
  degasification trough means substantially closed to the atmosphere, having at one end an inlet communicating with said fluid discharge port, a fluid outlet near the opposite end and a gas discharge port near the top.

7. The system of claim 6 wherein said fluid pump has means for removing gas bubbles liberated therein, said removing means being in communication with said gas suction port in said spray vessel.

8. The system of claim 6 further comprising first barrier means in said trough means to prevent gas communication between the open area inside said trough means with the open area inside said spray vessel.

9. The system of claim 6 further comprising second barrier means in said trough means adapted to maintain a fluid barrier means against gas flow from said trough out said fluid outlet.

10. The system of claim 7 wherein said fluid pump comprises a centrifugal impeller pump having a vortex opening through the impeller, a hollow elongated shaft connected to the impeller and communicating with said vortex opening, and conduit means communicating said hollow shaft with said gas suction port.

* * * * *